United States Patent
Hiroshige et al.

(10) Patent No.: US 8,262,476 B2
(45) Date of Patent: Sep. 11, 2012

(54) GAME APPARATUS, CHARACTER AND VIRTUAL CAMERA CONTROL METHOD, PROGRAM AND RECORDING MEDIUM

(75) Inventors: Nobuhisa Hiroshige, Tokyo (JP); Takashi Isono, Tokyo (JP)

(73) Assignee: Kabushiki Kaisha Square Enix, Tokyo (KP)

( * ) Notice: Subject to any disclaimer, the term of this patent is extended or adjusted under 35 U.S.C. 154(b) by 1248 days.

(21) Appl. No.: 12/029,802

(22) Filed: Feb. 12, 2008

(65) Prior Publication Data

US 2008/0207323 A1    Aug. 28, 2008

(30) Foreign Application Priority Data

Feb. 28, 2007    (JP) .................. P2007-50037

(51) Int. Cl.
- *A63F 9/24* (2006.01)
- *A63F 13/00* (2006.01)
- *G06F 17/00* (2006.01)
- *G06F 19/00* (2006.01)

(52) U.S. Cl. ............................. 463/32; 463/33
(58) Field of Classification Search ............. 463/32
See application file for complete search history.

(56) References Cited

U.S. PATENT DOCUMENTS

| | | | |
|---|---|---|---|
| 2003/0171142 A1 | 9/2003 | Kaji et al. | |
| 2006/0061567 A1* | 3/2006 | Ouchi | 345/419 |
| 2007/0275782 A1 | 11/2007 | Kaji et al. | |
| 2008/0085749 A1 | 4/2008 | Kaji et al. | |

FOREIGN PATENT DOCUMENTS

JP    2002-301264    10/2002

OTHER PUBLICATIONS

English language Abstract of JP 2002-301264.
U.S. Appl. No. 12/029,657 to Hiroshige et al., filed Feb. 12, 2008.

* cited by examiner

*Primary Examiner* — Melba Bumgarner
*Assistant Examiner* — Marcus Jones
(74) *Attorney, Agent, or Firm* — Greenblum & Bernstein, P.L.C.

(57) ABSTRACT

To apply a certain change to a displayed image while controlling a position and direction of a character and a virtual camera. In changing a direction of a character card without changing its position, when the direction changes slowly a direction of a character changes according to change direction of the character card, and a visual point of a virtual camera moves circularly according to the change direction of the character. When the direction of the character card is changed fast only the visual point moves circularly and the direction of the character does not change.

13 Claims, 7 Drawing Sheets

FIG. 5

| CHARACTER ID | POSITION | DIRECTION | HISTORY | | SELECTION FLAG | DIRECTION CHANGE FLAG |
|---|---|---|---|---|---|---|
| 501 | 502 | 503 | POSITION AND DIRECTION | ... POSITION AND DIRECTION | 505 | 506 |
| | | | 504 | | | |

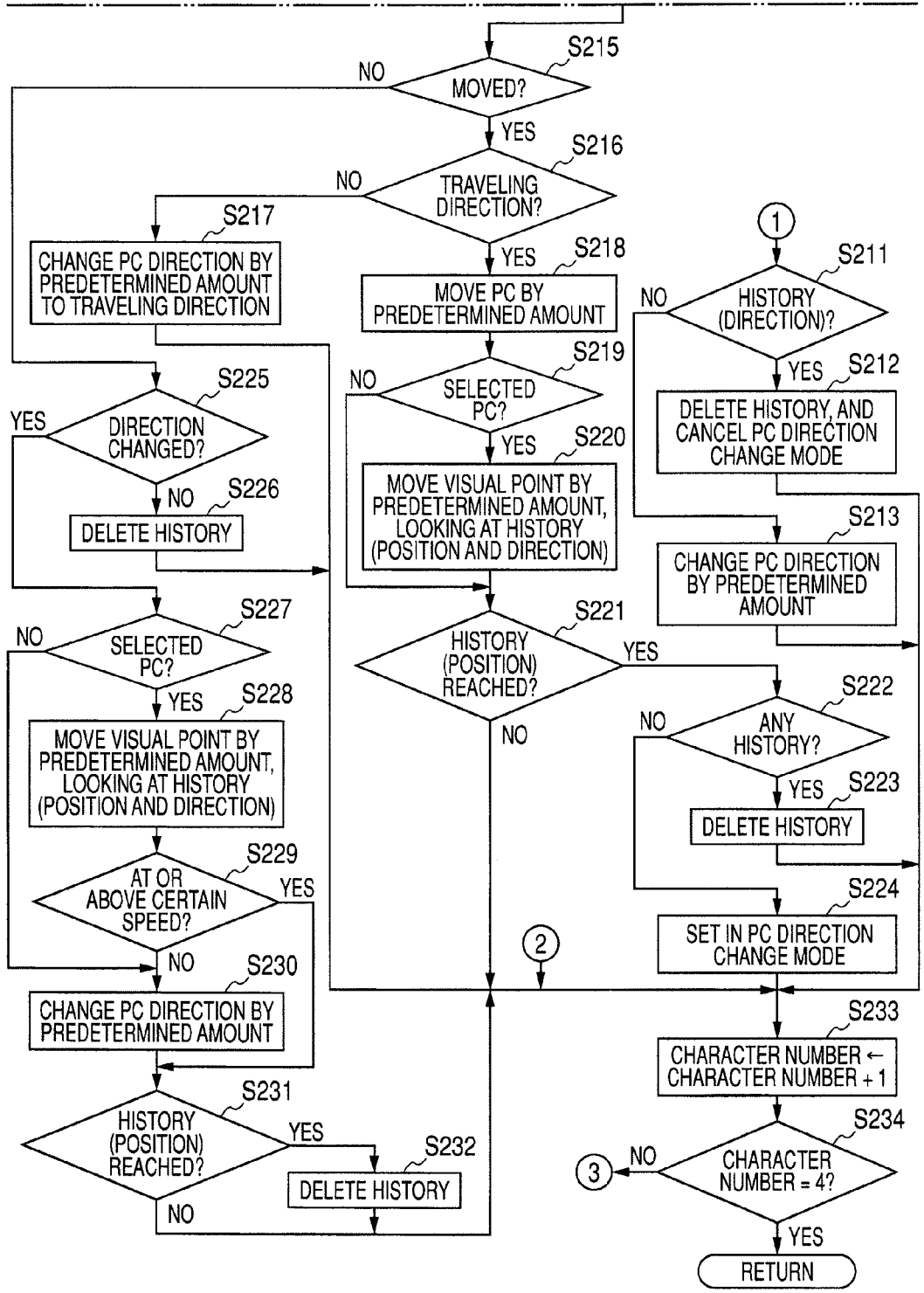

GAME APPARATUS, CHARACTER AND VIRTUAL CAMERA CONTROL METHOD, PROGRAM AND RECORDING MEDIUM

CROSS REFERENCE TO RELATED APPLICATION

The present disclosure relates to subject matter contained in Japanese Patent Application No. 2007-050037, filed on Feb. 28, 2007, the disclosure of which is expressly incorporated herein by reference in its entirety.

BACKGROUND OF THE INVENTION

1. Field of the Invention

The present invention relates to a technology for controlling a character and a virtual camera in accordance with a position and direction of a card operated by a player in a game in which a screen obtained by perspectively transforming a virtual three-dimensional space, in which the character exists, by means of the virtual camera is displayed.

2. Description of the Related Art

In a three-dimensional video game, an object existing in a virtual three-dimensional space is perspectively transformed onto a virtual screen by a virtual camera, and a two-dimensional image generated by means of the perspective transformation is displayed on a display device. This kind of three-dimensional video game is generally implemented by moving a player character in the virtual three-dimensional space by an operation of a player. The player character is directionally changed by the operation of the player when needed. That is, the operation of the player for changing a position and direction of the player character is an element indispensable to the game.

Also, among the three-dimensional video games, there is a card game which uses a card in implementing the game. As this kind of three-dimensional video game, there has been one which is implemented by placing a card, on a face of which information relating to a character is recorded, on a flat reader, and reading the information recorded on the card face in a game machine. In this video game, an arrangement is such that a player character corresponding to the card placed on is moved in accordance with an intuitive operation of a player for operating the card (refer to, for example, Japanese Unexamined Patent Publication No. 2002-301264).

Meanwhile, in order to increase a game reality in the heretofore described kind of three-dimensional video game, not only merely in what position or direction the player character is controlled but, above all, a control of a visual point of the virtual camera for imaging an aspect of the player character on a screen is increasingly important. In the heretofore known three-dimensional video game, an arrangement has been such that the control of the virtual camera is automatically carried out, such as by causing it to exactly follow a behavior of the player character, or by switching to any one of a plurality of points in accordance with a position of the player character.

Naturally, there is also a three-dimensional video game arranged so that a position of a visual point, and a direction of a visual axis, of a virtual camera can be controlled by an operation differing from an operation for changing a position and/or direction of a player character. However, an arrangement being such that the control of the position of the visual point, and the direction of the visual axis, of the virtual camera is performed by an operation of a joystick, a button or the like disposed on a game pad, it has been difficult to perform the control of the virtual camera by an intuitive operation of a player.

SUMMARY OF THE INVENTION

The invention has an object of providing a game apparatus or the like which can apply a certain change to a displayed image while controlling a position and direction of a character, and a position and direction of a virtual camera, by an intuitive operation of player.

In order to achieve the object, according to a first aspect of the present invention, there is provided a game apparatus which displays, on a display device, a game screen obtained by perspectively transforming, onto a virtual screen, a virtual three-dimensional space, in which a character acts in accordance with an instruction from a player, from a viewpoint of a virtual camera. The game apparatus includes a card disposition system that disposes a card on a plane corresponding to a virtual two-dimensional plane perpendicular to a height direction of the virtual three-dimensional space, a position and/or direction of the card being changed by the player. The game apparatus further includes a card detector that detects the position and direction of the card disposed on the card disposition system. The game apparatus further includes a character controller that controls a position and direction of the character in accordance with the position and direction of the card detected by the card detector. The game apparatus further includes a virtual camera controller that controls a position of a visual point and a direction of a visual axis of the virtual camera with the position of the character as a reference point in accordance with the position and direction of the card detected by the card detector. The game apparatus further includes a perspective transformer that perspectively transforms onto the virtual screen the virtual three-dimensional space from the viewpoint of the virtual camera, in which the position of the visual point and the direction of the visual axis is fixed by the virtual camera controller and generates a two-dimensional image to be displayed on the display device. The game apparatus further includes a display controller that display the two-dimensional image generated by the perspective transformer on the display device. In the game apparatus, the character controller does not change the direction of the character when the direction of the card is changing while the position of the card detected by the card detector is not substantially changed. In the game apparatus, the virtual camera controller, when the direction of the card is changing while the position of the card detected by the card detector is not substantially changed, circularly moves the position of the visual point around the character in order to change the direction of the visual axis in accordance with the change in the direction of the card.

In the game apparatus according to the first aspect, the position and direction of the character, the position of the visual point, and the direction of the visual axis are controlled in accordance with the intuitive operation of the player for changing the position and direction of the card. Naturally, when only the direction of the card is changed by the player, the direction of the character does not change. As opposed to this, the position of the visual point moves circularly around the character so that the direction of the visual axis is changed in accordance with the change in the direction of the card. In this way, the player, by changing only the direction of the card in the same position without changing the position thereof, can change only the position of the visual point and the direction of the visual axis, and cause an image of the character, shot from a desired angle, to be displayed on the game screen.

In the game apparatus, it is possible to arrange in such a way that the character controller, when the direction of the card is changing while the position of the card detected by the card detector is not substantially changed, does not change the direction of the character when the direction of the card is changed by a value within a range of a predetermined speed, and changes the direction of the character in accordance with the change in the direction of the card when the direction of the card is changing outside the range of the predetermined speed.

In this case, when the direction of the card is changed outside the range of the predetermined speed by the player, the direction of the character also changes in accordance with the change in the direction of the card. Meanwhile, when the direction of the card is changed within the range of the predetermined speed by the player, the direction of the character does not change. The player, by varying the speed of one operation of changing the direction of the card, can input two instructions, to change or not to change, the direction of the character at the same time as changing the position of the visual point and the direction of the visual axis, resulting in an improvement in operability.

Herein, it is also possible to arrange in such a way that the virtual camera controller, when the direction of the card is changing while the position of the card detected by the card detector is not substantially changed, does not circularly move the position of the visual point when the direction of the card is changed by a value outside the range of the first predetermined speed and within a range of the second predetermined speed, and circularly moves the position of the visual point in accordance with the change in the direction of the card when the direction of the card is changed by a value outside the range of the first predetermined speed and outside the range of the second predetermined speed.

In this case, when the direction of the card is changed outside the range of the first predetermined speed and outside the range of the second predetermined speed by the operation of the player, the position of the visual point moves circularly in accordance with the change in the direction of the card. Meanwhile, when the direction of the card is changed outside the range of the first predetermined speed and within the range of the second predetermined speed by the player, the position of the visual point does not move circularly, either. The player, by varying the speed of one operation of changing the direction of the card, can input three instructions, to circularly move the position of the visual point along with changing the direction of the character, to change the direction of the character but not to circularly move the position of the visual point, or to circularly move the position of the visual point without changing the direction of the character, resulting in an improvement in operability.

In the heretofore described game apparatus, it is possible to arrange in such a way that, when the position of the card detected by the card detector is moving, the character controller moves the position of the character in a direction in which the position of the card moves, regardless of the detected direction of the card, and controls a direction in which the character faces when the position of the character is moving, to a direction in which the position of the character moves.

In this case, although the position and direction of the character, the position of the visual point, and the direction of the visual axis are originally controlled in accordance with the position and direction of the card, in the event that the position of the card is moved by the operation of the player, the position of the character moves in the direction in which the position of the card moves. At this time, the direction of the character turns not in a direction corresponding to the direction of the card, but in a traveling direction (that is, a direction in which the position of the card moves). In this way, by turning the direction of the character, partway through moving, in the traveling direction regardless of the direction of the card, it does not happen that a display of the character on the game screen becomes unnatural.

Also, it is also possible to arrange in such a way that, after the movement of the position of the character corresponding to the movement of the position of the card is complete, the character controller changes the direction of the character to a direction corresponding to a direction of the card at a time point at which the movement of the position of the card is complete.

In this case, after the movement of the position of the character corresponding to the movement of the position of the card is complete by the operation of player, the direction of the character changes to the direction corresponding to the direction of the card which has finished moving. Consequently, although the direction of the character, partway through moving, is a direction regardless of the direction of the card, as it is finally controlled to the direction corresponding to the direction of the card, it is possible to respect the player's card operation (herein, a direction change operation).

In this case, it is also possible to arrange in such a way that when the position of the card detected by the card detector is moving, the virtual camera controller moves the position of the visual point in the direction in which the position of the card moves, while maintaining the direction of the visual axis in a certain direction, regardless of the detected direction of the card.

In this case, upon the position of the card being moved by the operation of the player, the position of the visual point moves in the direction in which the position of the card moves, while maintaining the direction of the visual axis. Consequently, partway through the movement of the character, the position of the visual point can be controlled in accordance with the position of the card. Also, as both the position of the character and the position of the visual point move in accordance with the movement of the position of the card (that is, move in parallel), in the event that the visual axis is controlled to a certain direction, even though the position of the visual point and the direction of the visual axis are not fixed in specific positions with respect to the position and direction of the character, it does not happen that the display of the character becomes unnatural.

Also, in this case, it is also possible to arrange in such a way that, when the position of the card detected by the card detector is moving, the virtual camera controller moves the position of the visual point so that the direction of the visual axis becomes a direction corresponding to the direction in which the character faces, regardless of the detected direction of the card.

In this case, upon the position of the card being moved by the operation of the player, the position of the visual point moves so that the direction of the visual axis becomes the direction corresponding to the direction in which the character faces. Consequently, as the position of the visual point and the direction of the visual axis, partway through the movement of the character, are controlled in accordance with the position and direction of the character, it is possible to display an image of the character as seen from the certain direction.

Furthermore, it is also possible to arrange in such a way that, after the movement of the position of the character corresponding to the movement of the position of the card is complete, the virtual camera controller moves the position of the visual point in such a way that the direction of the visual axis becomes the direction corresponding to the direction of the card at the time point at which the movement of the position of the card is complete.

In this case, the direction of the visual axis, after the movement of the position of the card is complete, turns in the direction corresponding to the direction of the card. Consequently, although the direction of the visual axis, partway through the movement of the character, is a direction regardless of the direction of the card, as it is finally controlled to the direction corresponding to the direction of the card, it is possible to respect the player's card operation (herein, the direction change operation).

In the heretofore described game apparatus, it is possible to arrange in such a way that the card disposition system disposes each of a plurality of the cards in an arbitrary position and direction. Also, the card detector may include an operated card determiner that determines a card, from among the plurality of cards, which has last been operated by the player. The card controller may control a position and direction of a character corresponding to each card in accordance with the position and direction of the plurality of cards, regardless of whether or not it is the card determined by the operated card determiner to have last been operated. The virtual camera controller may control the position of the visual point and the direction of the visual axis of the virtual camera in accordance with a position of a character corresponding to the last operated card as the reference point.

In this case, it is conceivable that the card last operated by the player is a card corresponding to a character which the player most wants to operate at the present time. Also, it is conceivable that the player wants to cause a character corresponding to an operated card, which is not the last operated card, to act. Consequently, although the position of the visual point and the direction of the visual axis are controlled in accordance with a position and direction of the last operated card, by controlling the position and direction of the character in accordance with a position and direction of the operated card regardless of whether or not the corresponding card has last been operated, it is possible to display the game screen desired by the player as far as possible on the display device.

In the heretofore described game apparatus, it is also acceptable that the card disposition system is configured of a card mounting base on which is placed a tangible card on which is recorded information which can identify the character. The apparatus may further include a card information reader that reads the information which is recorded on the card placed on the card mounting base. The card detector may detect a position and direction of the card in accordance with the information read by the card information reader.

In this case, the player, without carrying out a complicated operation, can dispose a card corresponding to the character in a desired position, and turn it in a desired direction. Also, the more kinds of card the player owns, the more options of usable characters increase. By this means, there occurs not only pleasure in merely playing a game, but also enjoyment in collecting cards to be used in the game.

In the heretofore described game apparatus, it is also acceptable that the card disposition system is configured of a virtual card display system that displays a virtual card prepared to correspond to the character as the card on a second display device which is provided separately from the display device and has a touch panel disposed on a front surface thereof. The apparatus may further include a virtual card controller that changes a position and direction of the virtual card displayed on the second display device in accordance with an operation of the touch panel by the player. The card detector may detect the position and direction of the virtual card displayed on the second display device.

In this case, the player can enjoy the game without preparing any card corresponding to the character.

In order to achieve the heretofore described object, according to a second aspect of the invention, there is provided a character and virtual camera control method in a game in which a game screen is obtained by perspectively transforming, on a virtual screen, a virtual three-dimensional space, in which a character acts in accordance with an instruction from a player, from a viewpoint of a virtual camera, and the transformed virtual space is displayed on a display device. The method includes detecting a position and direction of a card disposed in an arbitrary position and direction by the operation of the player on a plane corresponding to a virtual two-dimensional plane perpendicular to a height direction of the virtual three-dimensional space, and storing the detected position and direction of the card in a storage device. The method further includes, when the direction of the card is changing without at least the position of the card changing substantially, controlling a position and direction of the character, in accordance with the position of the card and direction stored in the storage device, so as not to change the direction of the character. The method further includes, when the direction of the card is changing without at least the position of the card is not changing substantially, controlling a position of a visual point and a direction of a visual axis of the virtual camera with the position of the character as a reference point, in accordance with the position of the card and direction stored in the storage device, in order to change the direction of the visual axis while circularly moving the position of the visual point around the character in accordance with the change in the direction of the card. The method further include perspectively transforming the virtual three-dimensional space from the virtual camera onto the virtual screen, the position of the visual point and the direction of the visual axis of the virtual camera being fixed, and generating a two-dimensional image to be displayed on the display device. The method further includes displaying the generated two-dimensional image on the display device.

In order to achieve the heretofore described object, according to a third aspect of the invention, there is provided a program which causes a computer apparatus to execute a game in which a game screen is obtained by perspectively transforming, onto a virtual screen, a virtual three-dimensional space, in which a character acts in accordance with an instruction from a player, from a viewpoint of a virtual camera, and the transformed virtual space is displayed on a display device. The program causes the computer apparatus to function as a card disposition system that disposes a card on a plane corresponding to a virtual two-dimensional plane perpendicular to a height direction of the virtual three-dimensional space, a position and/or direction of the card being changed by the player. The program further causes the computer apparatus to function as a card detector that detects the position and direction of the card disposed on the card disposition system. The program further causes the computer apparatus to function as a character controller that controls a position and direction of the character in accordance with the position of the card and the direction of the card detected by the card detector. The program further causes the computer apparatus to function as a virtual camera controller that controls a position of a visual point and a direction of a visual axis of the virtual camera with the position of the character as a reference point in accordance with the position of the card and the direction of the card detected by the card detector. The program further causes the computer apparatus to function as a perspective transformer that perspectively transforms onto the virtual screen the virtual three-dimensional space from the viewpoint of the virtual camera, in which the position of the visual point and the direction of the visual axis are fixed by the virtual camera controller and generates a two-dimensional image to be displayed on the display device. The program further causes the computer apparatus to function as a display controller that displays the two-dimensional image generated by the perspective transformer on the display device. In the program, the character controller does not change the direction of the character when the direction of the card is changing while the position of the card detected by the card detector is not substantially changed. The virtual camera controller, when the direction of the card is changing while the position of the card detected by the card detector is not substantially changed, circularly moves the position of the visual point around the character in order to change the direction of the visual axis in accordance with the change in the direction of the card.

The program according to the third aspect can be provided recorded on a computer readable recording medium. It is also acceptable that the computer readable recording medium is a recording medium which is configured in order to be attachable to and removable from the computer apparatus, and is provided separately from the computer apparatus. It is also acceptable that the computer readable recording medium is a recording medium, such as a fixed disk drive, which is installed inside the computer apparatus, and is provided together with the computer apparatus. The program according to the third aspect can also be distributed from a server existing on a network, with a data signal therefrom superimposed on a carrier, to the computer apparatus through the network.

BRIEF DESCRIPTION OF THE DRAWINGS

FIGS. 4A-1 to 4A-3 are views showing specific examples of a character card placed on a card disposition panel;

FIGS. 4B-1 to 4B-3 are views schematically showing a positional relationship between, and moving paths of, the player character and a visual point, in a case of looking down on a field of the virtual three-dimensional space from above;

FIG. 5 is a diagram illustrating a character table which is managed in a memory in order to carry out the card game on the card game apparatus according to the embodiment of the invention;

DESCRIPTION OF THE PREFERRED EMBODIMENT(S)

Hereafter, a description will be given of an embodiment of the invention, with reference to the accompanying drawings.

A game applied to the embodiment being a card game carried out using cards (a character card and an IC card), a player who participates in the game needs to have the cards. A player who does not have the cards can obtain the cards by purchasing a starter set including therein one or more character cards (trading cards) and one IC card (a memory card). The character card is one which the player uses for causing a character to participate in the game. The IC card is a recording medium on which is recorded a history of the game played by the player.

Figure 1:
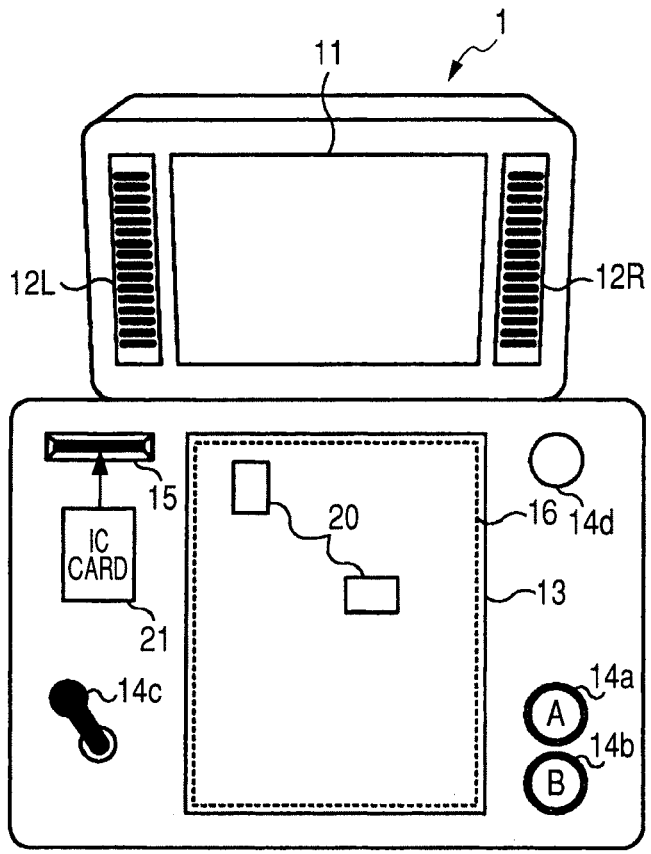
FIG. 1 is a view showing an external configuration of a card game apparatus according to an embodiment of the invention.

FIG. 1 is an external view showing an outline configuration of an arcade type card game apparatus applied to the embodiment. Herein, an arcade type game apparatus is shown as one example of a card game apparatus 1. In FIG. 1, a liquid crystal display (hereafter referred to as an LCD) 11 and sound outlet apertures of speakers 12L and 12R are formed on a front surface of the card game apparatus 1. The LCD 11 mounted on a center of the front surface of the card game apparatus 1 displays an image corresponding to an implementation of the game. The speakers 12L and 12R mounted on a left and a right, sandwiching the LCD 11, output a sound corresponding to the implementation of the game.

A card disposition panel 13, operating switches 14, and an IC card slot 15 are formed on a base (a top surface of the base) of the card game apparatus 1. Character cards 20 corresponding to characters, which the player causes to participate in the game, are placed on the card disposition panel 13 mounted in a center of the base of the card game apparatus 1. The card disposition panel 13 is a plane corresponding to a virtual two-dimensional plane perpendicular to a height direction of a virtual three-dimensional space (to be described hereafter). Character illustrations are printed on faces of the character cards 20, and data patterns (identification codes) for identifying the characters printed on the faces are recorded on backs thereof. Up, down, left and right directions are fixed for the character cards 20 in accordance with the illustrations printed on the faces, and data for identifying the directions of the character cards 20 are also recorded on the backs.

A transparent glass plate on which is mounted a thin play field sheet is attached to a top surface of the card disposition panel 13. The character cards 20 are placed on a top surface of the play field sheet, but will hereafter be described, for ease of explanation, as being placed on the card disposition panel 13. A pressure-sensitive touch panel 16 (an area delineated by a broken line in FIG. 1) is mounted on the top surface of the card disposition panel 13.

A light source, which irradiates an infrared ray (invisible light) onto the backs of the character cards 20 placed on the card disposition panel 13, an image sensor 108 (to be described hereafter, FIG. 2), which images the card data patterns recorded on the backs of the character cards 20 placed on the card disposition panel 13, a reflecting plate, which leads light reflected off the character cards 20 placed on the card disposition panel 13 to the image sensor, and a filter, which removes ambient light (visible light) included in the light reflected off the reflecting plate, are attached to an interior of the card disposition panel 13 (an interior of the base) of the card game apparatus 1. The light source is configured of a light emitting diode (LED) which emits invisible light, such as the infrared ray or an ultraviolet ray, invisible to the naked eye. In a case in which visible light is emitted from the light source, the filter removing the visible light is also attached to the interior of the card disposition panel 13 (the interior of the base) of the card game apparatus 1.

The operating switches 14 mounted on the left and right sandwiching the card disposition panel 13 include an operation switch (hereafter referred to as an "A button") 14a, an operation switch (hereafter referred to as a "B button") 14b, a joystick 14c, and a start switch 14d. The A button 14a and the B button 14b, mounted on a front to a right side of the card disposition panel 13, are used to input predetermined instructions such as, for example, an instruction for behavior of the player characters which the player can operate using the operating switches 14. The joystick 14c, mounted on a front to a left side of the card disposition panel 13, is used to input a direction on a game screen, such as instructing a movement direction of a cursor. The start switch 14d, mounted on a back to the right side of the card disposition panel 13, is used for inputting an instruction to start the game.

The IC card slot 15, mounted on a back to the left side of the card disposition panel 13, is one into which the player inserts the IC card 21. An IC card reader/writer which is to be electrically connected to the IC card 21 is built into an interior of the IC card slot 15. The player, before starting the game, inserts the IC card 21 into the IC card slot 15, and causes the IC card reader/writer 107 (to be described hereafter, refer to FIG. 2), provided inside the IC card slot 15, to read each item of data stored in the IC card 21. At least a character's skill and a past game result, corresponding to a kind and card data of a character card 20 owned by the player, are stored in the IC card 21.

A coin slot (not shown) and a card payout opening (not shown) are formed on a side surface (a side surface of the base) of the card game apparatus 1. The coin slot is one from which the player inserts a coin. The card payout opening is one from which the character card 20 is paid out after a finish of the game. The player, by inserting the IC card 21 into the IC card slot 15, inserting a coin for carrying out the game into the coin slot, and operating the start switch 14d, can start the game.

Figure 2:
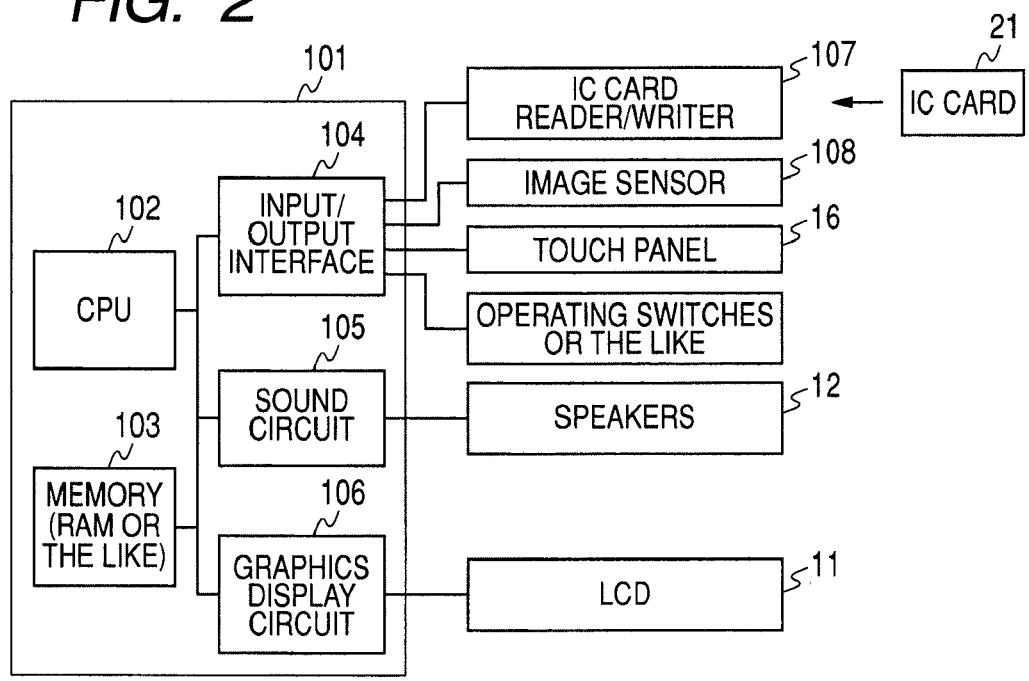
FIG. 2 is a block diagram showing a circuit configuration of the card game apparatus according to the embodiment of the invention.

FIG. 2 is a block diagram showing a configuration of the card game apparatus 1 of FIG. 1. As shown in the figure, the card game apparatus 1 is constructed centered on an apparatus main body 101. The apparatus main body 101 includes a CPU (Central Processing Unit) 102 connected to an internal bus thereof, a memory 103, an input/output interface 104, a sound circuit 105 and a graphics display circuit 106.

The CPU 102, executing a program stored in the memory 103, carries out a control of the apparatus main body 101. The CPU 102 includes an internal timer. The memory 103 is a storage area (a RAM, a ROM, an HDD or the like) for saving the program and data. Various image data to be displayed on the LCD 11, and the program, are stored in the memory 103.

The IC card reader/writer 107, the image sensor 108, the touch panel 16, the operating switches 14 and the like (including the card payout opening and the coin slot) are connected to the input/output interface 104. The IC card reader/writer 107, being mounted on the interior of the IC card slot 15, and connected to the IC card 20 inserted into the IC card slot 15, carries out a reading and writing of the data.

The image sensor 108 reads the card data stored on the back of the character card 20. The image sensor 108, based on an instruction from the CPU 102, reads an image on the card disposition panel 13 every 1/60 second, and transmits the image data to the memory 103.

The image data transmitted every 1/60 second from the image sensor 108 are temporarily saved in the memory 103, and the CPU 102 analyzes the image data. The same conditions as those of the heretofore known invention are used for the image data stored on the back of the character card 20. The CPU 102, by analyzing the image data, reads the data pattern on the back of each character card 20 placed on the card disposition panel 13, and determines a position and direction of the relevant character card 20 on the card disposition panel 13. Then, the CPU 103, in accordance with a result of the determination, determines a position and bodily direction, on a field of the virtual three-dimensional space, of a player character corresponding to each character card 20.

The touch panel 16 (including a device driver for the touch panel) transmits a pressed position on the card disposition panel 13 to a predetermined register provided in the memory 103. The CPU 102, by means of the output from the touch panel 16, identifies a character card 20 being pressed by the player, and sets a player character corresponding to the character card 20 as a selected character (to be described hereafter).

The operating switches 14 and the like are ones for inputting an instruction from the player. The input/output interface 104 transmits data input from the image sensor 108, operating switches 14, touch panel 16 and the like to the memory 103, and the CPU 102 interprets them and implements a calculation process. The input/output interface 104, also, based on the instruction from the CPU 102, causes data indicating a game implementation status (a result of a competition in the game, or the like), stored in the memory 103, to be saved in the IC card 21, retrieves data of the game at a time of interruption which are saved in the IC card 21, and transfers the data to the memory 103.

The sound circuit 105 is connected to the speakers 12. The sound circuit 105, in a case in which the program being executed by the CPU 102 instructs the sound circuit 105 to carry out a sound output, interprets the instruction, transmits a sound signal, and causes the speakers 12L and 12R, disposed in positions inside the heretofore described sound outlet apertures, to transmit a sound which is to be reproduced in accordance with the game being executed.

The graphics display circuit 106 is connected to the LCD 11. The graphics display circuit 106, in accordance with a drawing command transmitted from the CPU 102, expands an image in a frame memory (not shown, which is provided inside an RAM included in a chip configuring the graphics display circuit 106), and transmits a video signal for displaying an image on the LCD 11. A one-frame time of the image included in the video signal transmitted from the graphics display circuit 106 is, for example, 1/60 second.

Data for carrying out the game on the card game apparatus 1 are stored first in, for example, the IC card 21. The data stored in the IC card 21, when executed, are read by the IC card reader/writer 107, and loaded into the memory 103. The CPU 102 processes the data loaded into the memory 103, and the program stored therein, transmits the drawing command to the graphics display circuit 106, and transmits the sound output instruction to the sound circuit 105. Intermediate data on the process being carried out by the CPU 102 are stored in the memory 103.

Hereafter, a description will be given of a game which, in the embodiment, is executed on the card game apparatus 1 shown in FIGS. 1 and 2. The game according to the embodiment is a trading card game carried out using cards, in which, a field being formed in a virtual three-dimensional space (a game space) serving as a player character movement space, the player causes a player character corresponding to a character card 20 to participate in the game, and implements the game by inputting from the operating switches 14 and the touch panel 16 while causing the player character to act (such as attacking an enemy character) on the field.

The player, by placing a character card 20 on the card disposition panel 13, can cause a character, corresponding to the image data which the image sensor 108 has been caused to read, to participate in the game. In a game applied in this card game system, each player can cause three player characters to participate in the game. The player can cause a plurality of the player characters to participate in the game at one time, and a plurality of the player characters not to act at the same time.

A player team is formed by all the player characters caused to participate by the player. The player, by placing the character card 20 on the card disposition panel 13, can cause a degree of stamina of a character corresponding to the card data, included in the image data which the image sensor 108 has been caused to read, to be read from the IC card 20 and added as a degree of stamina of the player team. A sum of the degrees of stamina of all characters which the player has caused to participate in the game becomes the degree of stamina of the player team.

The enemy character also exists in the virtual three-dimensional space. It is acceptable that the enemy character is either one controlled by the CPU 102, or a player character which another player causes to participate in the game (provided that the card game apparatus 1 includes a communication device). In the same way as the player characters, a plurality (one or more, for example, three) of the enemy characters also form a team.

The game according to the embodiment configuring a plurality of stages, clearance conditions are set in each stage. Also, a time limit (for example, 160 seconds) being set in each stage, the player team suffers a defeat unless it can fulfill the clearance conditions set in the relevant stage within a time from the player characters being caused to participate in the game in each stage until the time limit elapses. The clearance conditions include, for example, a condition of causing the player characters to compete against the enemy characters, and reduce a degree of stamina of the enemy team to zero.

The game finishes in the event that the degree of stamina of the player team has decreased to zero, the clearance conditions have been fulfilled, or the clearance conditions have not been fulfilled when the time limit elapses. When the game finishes, one character card 20 is paid out from the card payout opening.

Immediately after the player causes a player character to participate in the game, the player character is disposed in a position on the field of the virtual three-dimensional space, which corresponds to a position of a corresponding character card 20, and turns in a direction corresponding to a direction of the corresponding character card 20. In the event that a character card 20 has been moved on the card disposition panel 13 by the player, a player character corresponding to the character card 20 moves on the field at a predetermined speed as far as a position on the field, which is determined by the CPU 102, along a trajectory of the movement on the card disposition panel 13 of the character card 20.

In the event that a direction of a character card 20 is changed on the card disposition panel 13 by the player, a player character corresponding to the character card 20 changes its direction to a direction on the field, which is determined by the CPU 102, along a trajectory of the change in the direction on the card disposition panel 13 of the character card 20.

However, in the event that a direction of a character card 20 is changed on the card disposition panel 13 by the player, exceptionally, there is a case in which a player character corresponding to the character card 20 does not change its direction, or there is also a case in which the player character is turned in a direction differing from that of the trajectory of the change in the direction of the character card 20. Details of the movement, and the change in the direction, of a player character will be described hereafter.

A position in the virtual three-dimensional space in which this field is formed is uniquely specified by coordinates of the world coordinate system (X, Y, Z). A player character is set with an approximately central point thereof as a fiducial point, and a position thereof in the virtual three-dimensional space is indicated by coordinates of the fiducial point in the world coordinate system. Also, a direction of the player character is expressed by an angle which each axis of the local coordinate system forms with each axis of the world coordinate system.

Figure 3:
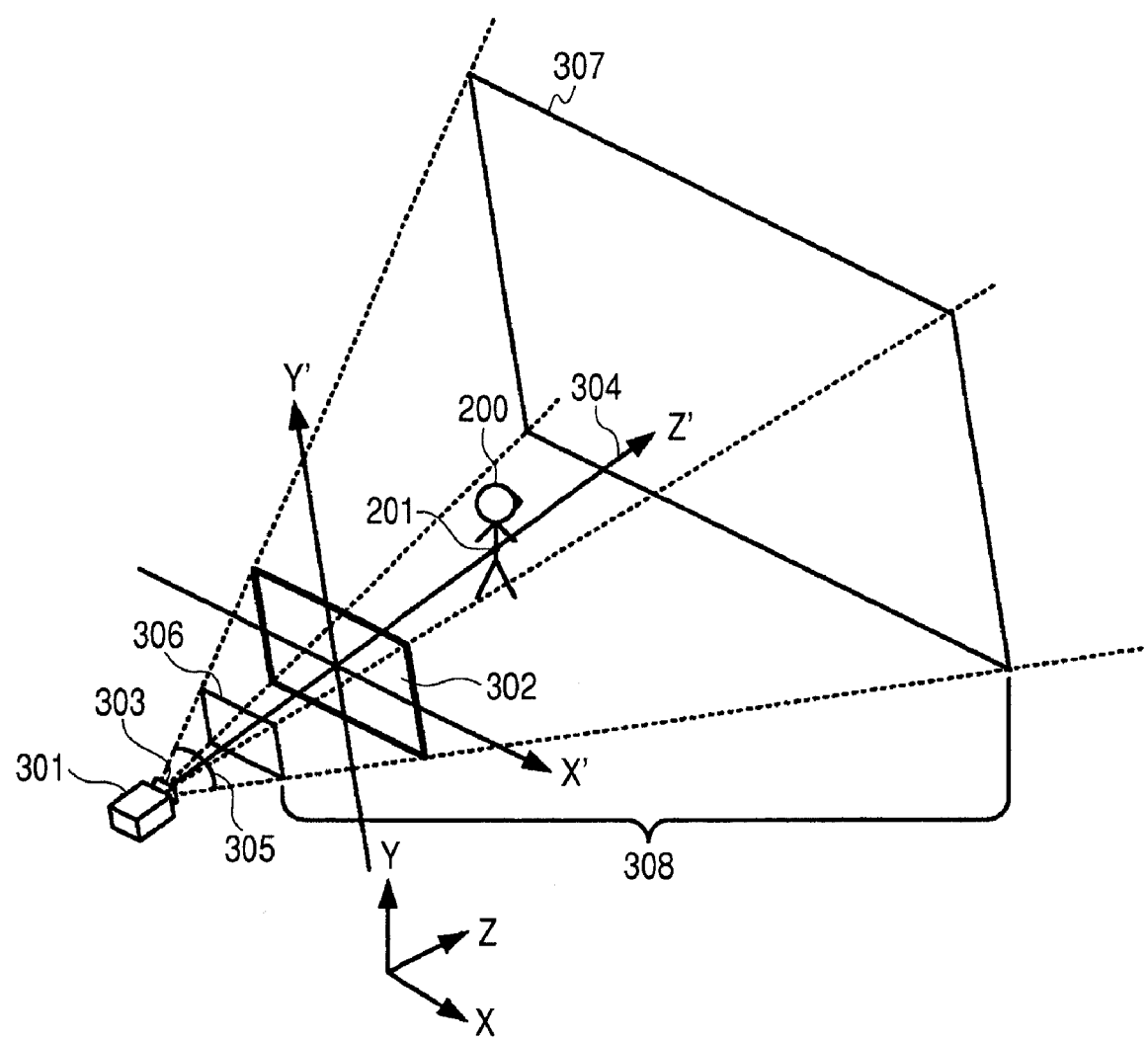
FIG. 3 is a view schematically showing a process for perspectively transforming and displaying a virtual three-dimensional space including a player character in a card game according to the embodiment of the invention.

An aspect in which a character inside the virtual three-dimensional space, including a player character, moves through the space is perspectively transformed onto an area set in a direction of a visual axis from a position of a visual point of a virtual camera, and an image thereof is displayed on the LCD 11. FIG. 3 is a view schematically showing an aspect in which the virtual three-dimensional space is perspectively transformed.

As shown in FIG. 3, a virtual camera 301 is put inside the virtual three-dimensional space. A position of the virtual camera 301 is a visual point 303, a direction of the virtual camera 301 is a visual axis 304, and an area defined by four straight lines which connect the visual point 303 and four corners of vertices of a virtual screen 302 is a visual field 305. The virtual screen 302 is put in a position located a certain short distance from the visual point 303 in a direction of the visual axis 304.

Within a range of the visual field 305, a front grip plane 306 is set a certain short distance from the visual point 303 in the direction of the visual axis 304, and a back grip plane 307 is set a certain long distance away. Within the range of the visual field 305, a range from the front grip plane 306 to the back grip plane 307 is fixed as a visual field space 308 which is a range in which an image is drawn by means of the perspective transformation.

In this way, a coordinate system used for projecting an image onto the virtual screen 302 being a visual point coordinate system (X', Y', Z'), the direction of the visual axis 304 is a Z' axis of the visual point coordinate system. Coordinates of the world coordinate system (including coordinates converted from coordinates of the local coordinate system) are converted into coordinates of the visual point coordinate system, and a perspective transformation process, including a hidden surface removal process, is carried out. The graphics display circuit 106 draws in the frame memory the image projected onto the virtual screen 302 by means of the perspective transformation.

As a premise for carrying out the perspective transformation, it is necessary to determine in advance the position of the visual point 303 of the virtual camera 301, the direction of the visual axis 304 thereof, a size of the visual field 305 (a distance from the visual point 303 to the virtual screen 302), and a size of the visual field space 308 (a distance from the visual point 303 to the front grip plane 306 and the back grip plane) (when they are determined, a position of the virtual screen 302 is automatically determined). It is taken that the size of the visual field 305, and the visual field space 308, are set to be basically of the same size.

The position of the visual point 303 is set in a direction of a back of a character card 20 corresponding to a player character 200 designated as a selected character, to be described hereafter, with a reference position of the character card 20 as a reference point. The direction of the visual axis 304 is set in such a way as to always face a fiducial point 201 of the player character 200 designated as the selected character to be described hereafter.

A player character 200 corresponding to a character card 20 last placed on (that is, pressed or being pressed against) the card disposition panel 13 by the player is designated as the selected character. The player, by touching (that is, having pressed or pressing) an optional character card 20 placed on the card disposition panel 13, can designate a player character corresponding to the character card 20 as the selected character. When a new selected character is designated, the designation of the previous selected character is cancelled.

In FIG. 3, the player character 200 is designated as the selected character. In the event that a player character 200 designated as the selected character is disposed in a position corresponding to a position of a character card 20 corresponding to the player character 200, and faces in a direction corresponding to a direction of the character card 20, the fiducial point 201 of the player character 200 designated as the selected character is set as the reference point, and the direction of the visual axis 304 is set in a direction (a back to front direction) of the player character 200 (however, there is an exception). In the event that the reference point and the direction of the visual axis 304 are set, the visual point 303 is set a certain distance on the visual axis 304 from the reference point (hereafter, a visual point distance).

In the event that the selected character is changed by the player touching a character card 20, on the card disposition panel 13, other than the character card 20 corresponding to the player character 200 designated as the selected character, a fiducial point 201 of the player character 200 newly designated as the selected character is set as the reference point, and the direction of the visual axis 304 is set in a direction (the back to front direction) of the player character 200.

Next, a description will be given, using FIG. 4, of a movement of a position, and/or a change in a direction, of a character card 20, a movement of a position, and/or a change in a direction, of a player character 200 corresponding to the character card 20, and a relationship between the position of the visual point 303 and the direction of the visual axis 304.

Figures 1, 4A:
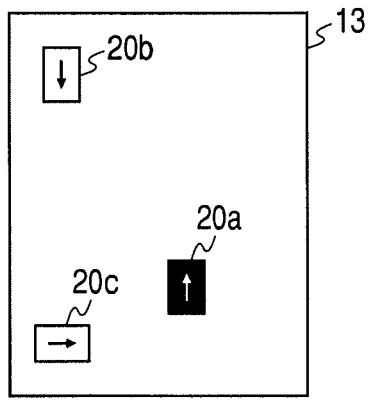
Figures 1, 4B:
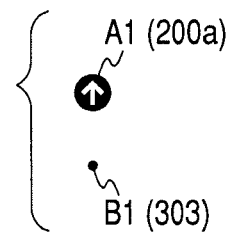
Figures 2, 4A:
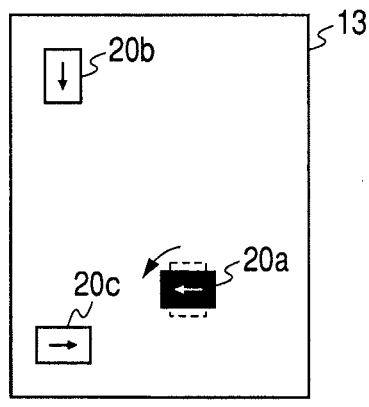
Figures 2, 4B:
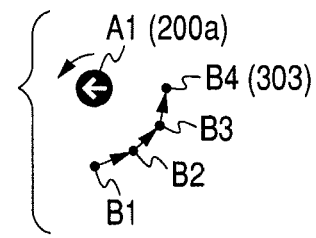
Figures 3, 4A:
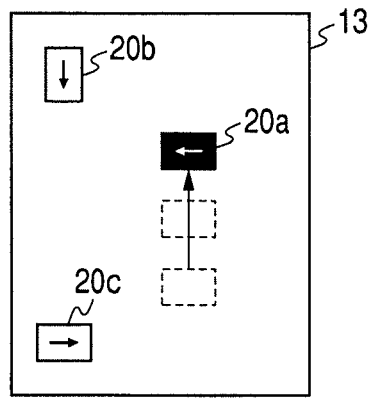
Figures 3, 4B:
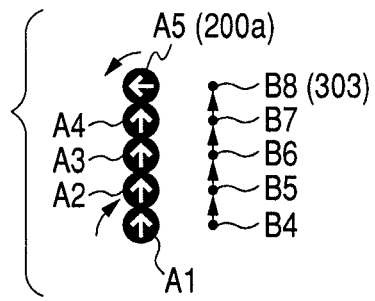

FIGS. 4A-1 to 4A-3 are views showing specific examples of a disposition of a character card 20 placed on the card disposition panel 13. FIGS. 4B-1 to 4B-3 are views schematically showing a positional relationship between, and moving paths of, a player character 200 and the visual point 303, in a case of looking down on the field of the virtual three-dimensional space from above.

In FIG. 4A-1, three character cards 20a to 20c are placed on the card disposition panel 13. An arrow of each character card 20 indicates a direction of the character card 20. A character card 20 corresponding to a player character 200 designated as the selected character is shown in black in order to show it in an understandable way.

In FIG. 4A-1, the character card 20a is last touched (last pressed or being pressed), and a player character 200a corresponding to the character card 20a is designated as the selected character. A position of the player character 200a on the field of the virtual three-dimensional space, and a position of the visual point 303 of the virtual camera 301, in a condition of FIG. 4A-1 are indicated by a filled circle A1 and a point B1, respectively, in FIG. 4B-1. In the virtual three-dimensional space, in order to show the bodily direction of the player character 200a in an understandable way, an arrow indicating the bodily direction of the player character 200a is affixed inside the filled circle A1.

In FIG. 4A-1, in the virtual three-dimensional space, the player character 200a, being disposed in a position corresponding to the position of the character card 20a, faces in a direction corresponding to the direction of the character card 20a. In this case, the fiducial point 201 of the player character 200a is set as the reference point, the direction of the visual axis 304 is set in a direction (the back to front direction) of the player character 200a, and the position of the visual point 303 is set at a point (the point B1) which is positioned at the visual point distance on the visual axis 304 from the reference point.

It is taken that the character card 20a being touched by the player is rotated counterclockwise at a speed below the predetermined speed in the same position on the card disposition panel 13, in the condition of FIG. 4A-1, and takes on the condition of FIG. 4A-2. FIG. 4B-2 shows a position and direction of the player character 200a, and a movement of the visual point 303, in a case in which the disposition of the character card 20a in FIG. 4A-1 is changed to that in FIG. 4A-2 by the player rotating the character card 20a below the predetermined speed.

In this case, the player character 200a, in the position of the filled circle A1, changes its bodily direction at a predetermined speed along a trajectory described by the character card 20a being directionally changed (rotated counterclockwise). Following the change in the direction of the player character 200a, the position of the visual point 303 is set behind the character card 20a with a fiducial point of the character card 20a as a reference point. Consequently, following the change in the direction of the player character 200a, the position of the visual point 303 moves on a circle having the visual point distance as a radius, from the point B1 to a point B2, and from the point B2 to a point B3, around the fiducial point 201 of the player character 200a. In accordance with the movement of the position of the visual point 303, the direction of the visual axis 304 is changed in order to always use the fiducial point 201 as the reference point.

Naturally, the player character 200a does not change its direction in the event that the disposition of the character card 20a in FIG. 4A-1 is changed to that in FIG. 4A-2 by the player rotating the character card 20a counterclockwise at or above the predetermined speed. However, the position of the visual point 303 moves in accordance with a direction in which the player character 200a is to turn in the event that the character card 20a has been rotated below the predetermined speed. That is, although the direction of the player character 200a does not change, the position of the visual point 303, in the same way as in the case shown in FIG. 4B-2, moves on the circle having the visual point distance as the radius, from the point B1 to the point B2, and from the point B2 to the point B3, around the fiducial point 201 of the player character 200a which is the reference point. In accordance with the movement of the position of the visual point 303, the direction of the visual axis 304 is changed in such a way as to always use the fiducial point 201 as the reference point.

It is taken that, in a condition in which the player character 200a is disposed in a position (the filled circle A1) corresponding to the position of the character card 20a shown in FIG. 4A-2, and faces in a direction (a left) corresponding to the direction of the character card 20a, the character card 20a being touched by the player is moved in an upward direction without its direction being changed, and takes on the condition of FIG. 4A-3. FIG. 4B-3 shows a position and direction of the player character 200a, and a movement of the visual point 303, in a case in which the disposition of the character card 20a in FIG. 4A-2 is changed to that in FIG. 4A-3.

In this case, the player character 200a, first, in the position of the filled circle A1, changes its bodily direction, at the predetermined speed, to a direction in which the character card 20a has been moved (that is, a traveling direction). As long as the player character 200a is changing its direction to the traveling direction in the position of the filled circle A1, the position of the visual point 303 (the point B4) and the direction of the visual axis 304 does not change.

Then, the player character 200a facing in the traveling direction moves from the filled circle A1 to a filled circle A2, from the filled circle A2 to a filled circle A3, from the filled circle A3 to a filled circle A4, and from the filled circle A4 to a filled circle A5, at the predetermined speed, along a trajectory described by the position of the character card 20*a* being moved. Following the movement of the player character 200*a*, the position of the visual point 303 is set in a position located the visual point distance behind the player character 200*a* in a case of supposing that the player character 200*a* faces in a direction corresponding to that of the trajectory of the change in the direction of the character card 20*a*, and moves from the point B4 to a point B5, from the point B5 to a point B6, from the point B6 to a point B7, and from the point B7 to a point B8. During the movement of the player character 200*a*, as the position of the visual point 303 moves parallel to the player character 200*a*, and always has the fiducial point 201 of the player character 200*a* as the reference point, the direction of the axis 304 is kept constant.

As the direction of the player character 200*a*, which has arrived at a position (the filled circle A5) on the field corresponding to the position in which the moved character card 20*a* is placed on the card disposition panel 13, differs from the direction of the character card 20*a*, the player character 200*a*, in the position of the filled circle A5, changes its bodily direction at the predetermined speed in accordance with the direction of the character card 20*a*. Even in the event that the player character 200*a* changes its direction at the filled circle A5, the position of the visual point 303 (the point B8) and the direction of the visual axis 304 do not change. Herein, the position of the visual point 303 is set in the position located the visual point distance behind the player character 200*a*.

Next, a description will be given of data managed in the memory 103 in order to carry out the card game on the card game apparatus 1. FIG. 5 is a diagram showing a character table 500 provided in the memory 103 inside the card game apparatus 1. As shown in the figure, a character ID 501, a position 502, a direction 503, a history 504, a selection flag 505, and a direction change flag 506 are registered in the character table 500 for each player character 200.

As it is possible for one player to cause three player characters 200 to participate at one time in the card game according to the embodiment, spaces in which the three player characters 200 can be registered are provided in the memory 103. In the character table 500, numbers 1 to 3 being allotted in order from the top, data on character cards 20 are registered from the top in an order in which the player places them on the card disposition panel 13. The character ID 501 is identification information which uniquely identifies each player character 200.

The position 502 indicates a position of a player character 200 in the game space by coordinates set in the game space. The direction 503 indicates a direction in which the player character 200 faces, for example, by a range of 0 to 359 degrees with a predetermined direction in the game space as a reference direction (a direction of 0 degrees). The history 504, in which a position and direction of a character card 20 corresponding to the player character 200 are stored for each frame, is configured of a plurality of spaces. A position and direction of a character card 20 input by a touch on the touch panel 16 for each frame period are saved in each space of the history 504.

In the history 504, the earlier a space data (the position and direction) are registered in, the earlier a timing at which the data have been registered. A history 504 of a moving player character 200 (a position and direction are also registered in another space other than an initial space of the history 504) is deleted by the player character 200 being positioned in a position registered in the history 504.

The selection flag 505 is a flag set for a player character 200 selected as the selected character. It does not happen that a plurality of the selection flags 505 are set in the character table 500. In the event that a selection flag 505 is set for one player character 200, a selection flag 505 set for another player character is reset.

The direction change flag 506 is a flag set for a player character 200 set in a player character direction change mode. A player character 200, in the event that, when it arrives at a position determined by a position of a corresponding character card 20 (a position in the history 504), it does not face in a direction determined by a direction of the character card 20, is set in the player character direction change mode. The direction 503 of the player character 200 set in the player character direction change mode is changed at the predetermined speed to the direction determined by the direction of the character card 20. In the event that the direction 503 of the player character 200 set in the player character direction change mode matches the direction determined by the direction of the character card 20, the direction change flag 506 is reset, and the player character direction change mode is cancelled.

Hereafter, a description will be given of a process for carrying out the card game according to the embodiment on the card game apparatus 1. There is a case in which a process other than a process specific to the embodiment is omitted from a description. Also, information on the process carried out partway by the CPU 102 is temporarily stored in a work area of the memory 103.

Figure 6:
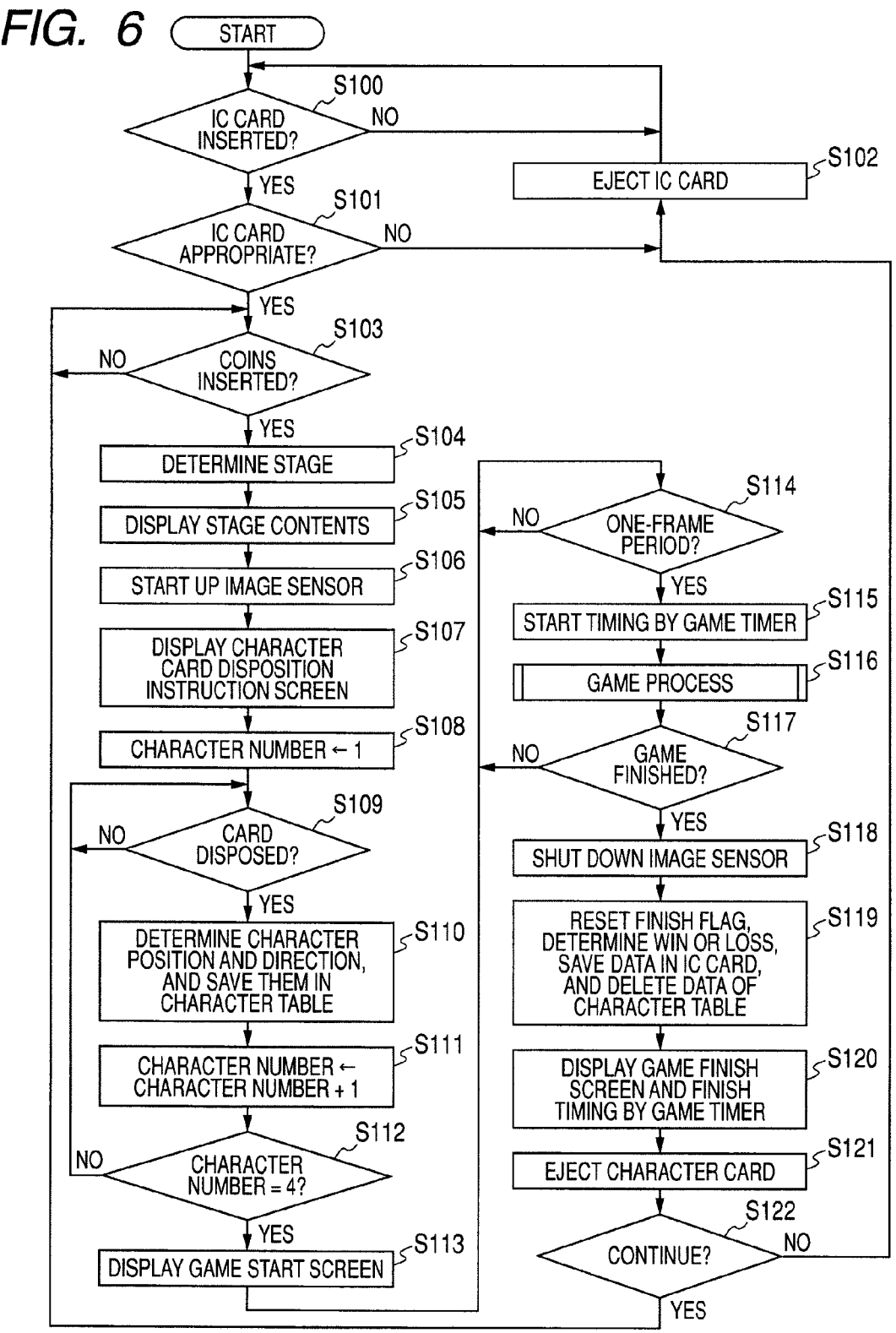
FIG. 6 is a flowchart showing a main process executed in the card game apparatus according to the embodiment of the invention.

FIG. 6 is a flowchart showing a main process executed in the card game apparatus 1. When the apparatus main body 101 of the card game apparatus 1 is powered on, START information is input into the CPU 102, and the main process is started.

The CPU 102 determines whether or not the IC card 21 is inserted in the IC card slot 15 (step S100). If the IC card 21 is not inserted, the CPU 102 repeats the process of step S100, and waits for the IC card 21 to be inserted. If the IC card 21 is inserted, the CPU 102 checks data read from the IC card 21 by the IC card reader/writer 107, and determines whether or not the IC card 21 is appropriate for a game to be carried out on the relevant card game apparatus 1 (step S101). If the IC card 21 is not appropriate for the game, the CPU 102 ejects the IC card 21 from the IC card slot 15 (step S102). Then, the CPU 102 returns to the process of step S100.

If the IC card 21 is appropriate for the game, the CPU 102 determines whether or not there has been an insertion of coins of an amount which is paid for the game through the coin slot (step S103). If there is no insertion of coins, the CPU 102 repeats a process of step S103, and waits for coins to be inserted. If coins have been inserted, the CPU 102, in accordance with data read from the IC card 21 by the IC card reader/writer 107, determines a stage to be carried out this time (step S104). Then, the CPU 102 issues a drawing command to the graphics display circuit 106 so as to display the clearance conditions of the stage, information on the enemy team, and the like, on the LCD 11 (step S105).

The CPU 102 issues a command to the input/output interface 104 so as to start up the image sensor 108. Then, the CPU 102 issues a command to the image sensor 108, and causes it to transmit the image data on the card disposition panel 13 to the memory 103 (step S106). The CPU 102 issues a drawing command to the graphics display circuit 106 so as to display an image on the LCD 11 which instructs the player to position three character cards 20 (step S107). The CPU 102 assigns an initial value 1 to a character number (step S108).

The CPU 102 analyzes the image data transmitted to the memory 103 and, depending on whether or not data of the character cards 20 are included therein, determines whether or not the character cards 20 have been placed on the card disposition panel 13 (step S109). If the data of the character cards 20 are not included in the image data read by the image sensor 108, the CPU 102 returns to the process of step S109, and waits until a new character card 20 is placed on the card disposition panel 13.

If a new character card 20 is placed on the card disposition panel 13, the CPU 102 determines information on the character card 20 (a character ID), and a position and direction in which each character card 20 is placed, and saves a position and direction on the field of a player character 200 corresponding to the character card 20 in a position 502 and direction 503 in the character table 500 which correspond to a present character number. If the present character number is 3, the CPU 102 sets a selection flag 505 for the player character 200 (step S110).

The CPU 102 adds 1 to the character number, and assigns an obtained value to the character number (step S111). Then, the CPU 102, depending on whether or not the character number has become 4, determines whether or not three character cards 20 have been placed on the card disposition panel 13 (step S112). If the character number is not 4, the CPU 102 returns to the process of step S109. If the character number is 4, as it means that three character cards 20 have been disposed, the CPU 102 issues a drawing command to the graphics display circuit 106 so as to cause a display on the LCD 11 indicating a starting of a game corresponding to the stage determined in the process of step S104 (step S113).

The CPU 102 determines whether or not a one-frame period of 1/60 second has elapsed (step S114). If the one-frame period has not elapsed, the CPU 102 returns to the process of step S114, and waits until the one-frame period elapses. If the one-frame period has elapsed, the CPU 102, using its internal timer, starts a timing by a game timer (step S115).

Then, the CPU 102 carries out a game process corresponding to the stage (step S116). The game process is a process which, being executed every time the elapsing of the one-frame period is determined, is carried out particularly in order to display an image on the LCD 11. Details of the game process will be described hereafter. Then, after a finish of the game process, the CPU 102, depending on whether or not a finish flag is set in the memory 103, determines whether or not a game has finished (step S117). If the game has not finished, the CPU 102 returns to the process of step S114. If the game has finished, the CPU 102 issues a command to the input/output interface 104 so as to shut down the image sensor 108 (step S118).

The CPU 102 resets the finish flag set in the memory 103, and carries out a win or loss determination for determining which team has won. Herein, in the event that the degree of stamina of the player team has decreased to zero, the player team loses in the event that it has not fulfilled the clearance conditions when the time limit elapses, while in the event that the degree of stamina of the enemy team has decreased to zero, the player team wins in the event that it has fulfilled the clearance conditions within the time limit. The CPU 102 calculates parameters of each player character 200 participating in the game, and their team, and stores the calculated parameters in the IC card 21. The CPU 102 deletes the data registered in the character table 500 (step S119).

The CPU 102 issues a drawing command to the graphics display circuit 106 so as to cause a display on the LCD 11 indicating that the game has finished. Then, the CPU 102 finishes the timing by the game timer (step S120). The CPU 102 pays out one character card 20 from the card payout opening (step S121). Then, depending on whether or not the A button 14a has been operated, the CPU 102 determines whether or not an instruction to continue the game has been input by the player (step S122). If the instruction to continue the game has been input, the CPU 102 returns to the process of step S103. If the instruction to continue the game has not been input, the CPU 102 returns to the process of step S102, and ejects the IC card 21 from the IC card slot 15.

Figure 7:
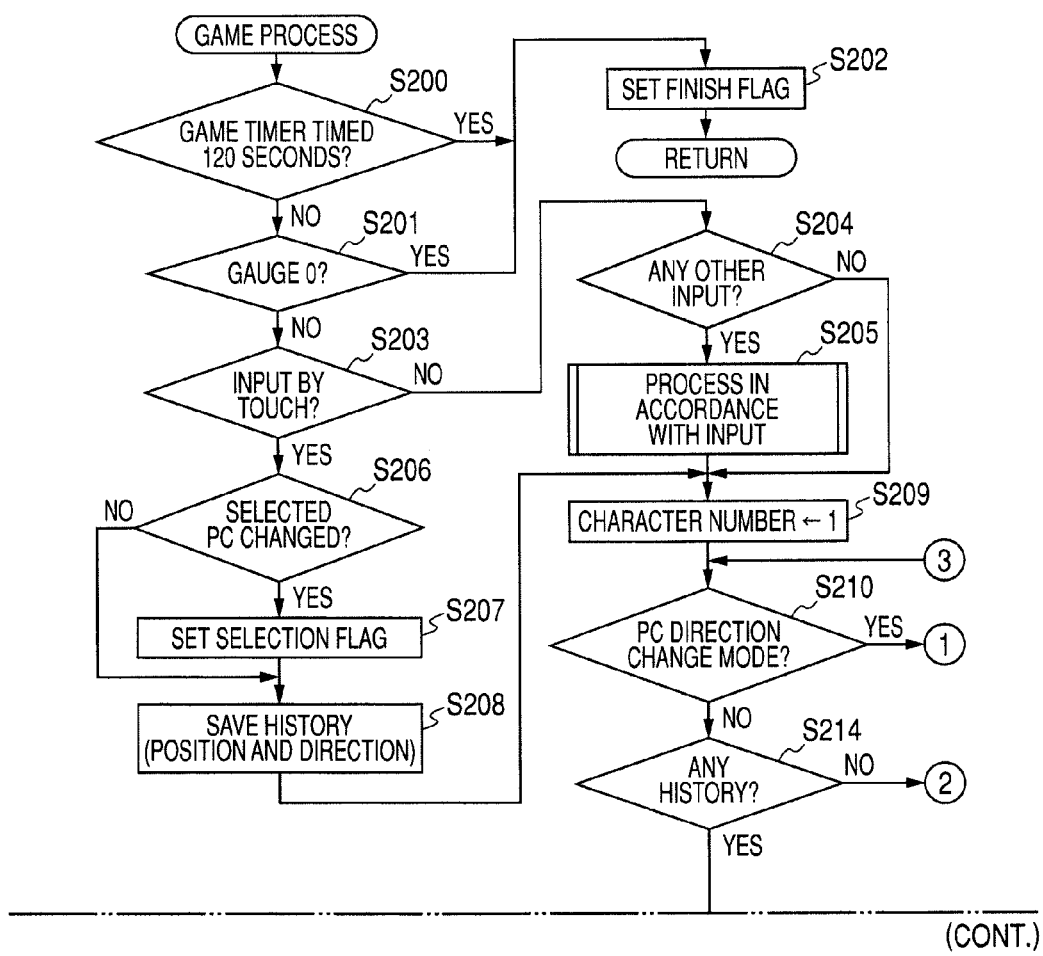
FIG. 7 is a flowchart showing in detail the game process of FIG. 6.

FIG. 7 is a flowchart showing in detail the game process executed in step S116 of FIG. 6. The game process is a process which finishes within at least 1/60 second. In the game process, the CPU 102 determines whether or not the game timer which its internal timer times has timed 120 seconds (step S200). If the game timer has timed 120 seconds, the CPU 102 proceeds to a process of step S202. If the game timer has not timed 120 seconds, the CPU 102 determines whether or not a sum of the degrees of stamina of either team has decreased to zero (step S201).

If the sum of the degrees of stamina of either team has decreased to zero, the CPU 102 proceeds to the process of step S202. In step S202, the CPU 102 sets a finish flag in the memory 103. Then, the CPU 102 finishes the game process, and returns to the processes of the flowchart of FIG. 6. If the sum of the degrees of stamina of either team has not decreased to zero, the CPU 102 determines whether or not a position on the touch panel 16 at which a touch input has been carried out is a position in which any character card 20 is placed (step S203).

If no touch input has been carried out at a position in which a character card 20 is placed, the CPU 102 determines whether or not another input has been carried out from the operating switches 14 or the touch panel 16 (step S204). If no other input has been carried out, the CPU 102 proceeds to a process of step S209. If the other input has been carried out, the CPU 102 carries out a process corresponding to the input (such as, for example, causing the selected character to carry out an attack against an enemy character) (step S205). Then, the CPU 102 proceeds to the process of step S209.

If a touch input is carried out at a position in which a character card 20 is placed, the CPU 102, depending on whether or not the position input by means of the touch input is a character card 20 other than a character card 20 corresponding to the selected character (a player character 200 for which a selection flag 505 is set), determines whether or not a change of the selected character has been carried out (step S206). If a character card 20 other than the character card 20 corresponding to the selected character is touched, it is a case in which the change of the selected character has been carried out, and the CPU 102 sets a selection flag 505 for a player character 200 corresponding to the touched character card 20, and resets a selection flag 505 set for another player character 200 (step S207). Then, the CPU 102 proceeds to a process of step S208.

If no character card other than the character card 20 corresponding to the selected character is touched, the CPU 102 determines that the position input by means of the touch input is the character corresponding to the selected character. In this case, the change of the selected character not being carried out, the CPU 102 proceeds directly to the process of step S208.

In step S208, the CPU 102 saves a position and direction of the character card 20 input by touching in a space next to a space in which a history 504 is saved for the player character 200 for which the selection flag 505 is set (in the event that there is no history saved, a first space of a history 504). Then, the CPU 102 proceeds to the process of step S209.

In step S209, the CPU 102 assigns an initial value 1 to the character number. Then, the CPU 102, depending on whether or not a direction change flag 506 is set in the character table 500 for a player character 200 corresponding to a present character number in the character table 500, determines whether or not the player character 200 is set in the player character direction change mode (step S210).

If the direction change flag 506 is set, it is a case in which the player character 200 is set in the player character direction change mode, and the CPU 102 determines whether or not the direction 503 of the player character 200 matches a direction determined by a direction registered in the first space of the history 504 (step S211). If there is a match, the CPU 102 deletes the position and direction registered in the first space of the history 504. Then, the CPU 102 resets the direction change flag set in the character table 500 for the player character 200, and cancels the player character direction change mode (step S212). Then, the CPU 102 proceeds to a process of step S233.

If the direction 503 of the player character 200 does not match the direction determined by the direction registered in the first space of the history 504, the CPU 102 turns the direction 503 of the player character 200 in the direction determined by the direction registered in the first space of the history 504, and changes it by a predetermined amount (step S213). Then, the CPU 102 proceeds to the process of step S233.

If no direction change flag 506 is set, it is a case in which the player character 200 is not set in the player character direction change mode, and the CPU 102 determines whether or not a history 504 is registered in the character table 500 for the player character 200 (step S214). If no history 504 is registered, the CPU 102 proceeds to the process of step S233. If a history 504 is registered, the CPU 102, depending on whether or not a position 502 of the player character 200 registered in the character table 500 matches a position determined by the position registered in the first space of the history 504, determines whether or not the player character 200 is to be moved on the field (step S215).

If the position 502 registered in the character table 500 does not match the position determined by the position registered in the first space of the history 504, it is a case in which the player character 200 is to be moved on the field, and the CPU 102 determines whether or not a direction (the traveling direction) from the position 502 of a player character 200 to the position registered in the first space of the history 504 matches a direction 503 registered in the character table 500 for the player character 200 (step S216).

If the traveling direction does not match the direction of the player character 200, the CPU 102 changes the direction 503 of the player character 200 by the predetermined amount to the traveling direction (step S217). Then, the CPU 102 proceeds to the process of step S233. If the traveling direction matches the direction of the player character 200, the CPU 102 moves the position 502 of the player character 200 by the predetermined amount toward the position determined by the position registered in the first space of the history 504 (step S218).

The CPU 102 determines whether or not a selection flag 505 is set in the character table 500 for the player character 200 (step S219). If no selection flag 505 is set, as the player character 200 is not designated as the selected character, the CPU 102 proceeds to a process of step S221. If a selection flag 505 is set, as the player character 200 is designated as the selected character, the CPU 102 moves the position of the visual point 303 by a predetermined amount to a position determined by the position and direction registered in the first space of the history 504 (that is, behind the character card 20 with the fiducial position of the character card 20 as the reference point). Then, the CPU 102 turns the direction of the visual axis 304 from the position of the visual point 303 toward the fiducial point 201 of the selected character (step S220). Then, the CPU 102 proceeds to the process of step S221.

In step S221, the CPU 102, depending on whether or not the position 502 registered in the character table 500 for the player character 200 matches the position determined by the position registered in the first space of the history 504, determines whether or not the player character 200 has arrived at the position corresponding to the position registered in the first space of the history 504.

If the player character 200 has not arrived at the position corresponding to the position registered in the first space of the history 504, the CPU 102 proceeds to the process of step S233. If the player character 200 has arrived at the position corresponding to the position registered in the first space of the history 504, the CPU 102 determines whether or not the position and direction of the player character 200 are registered in a space other than the first space of the history 504 (step S222). If the position and direction are registered in a space other than the first space of the history 504, it is a case in which the player character 200 is to continue the movement, and the CPU 102 deletes the position and direction registered in the first space of the history 504 (step S223). Then, the CPU 102 proceeds to the process of step S233.

If the position and direction are not registered in a space other than the first space of the history 504, it is a case in which the player character 200 has arrived at a position corresponding to a position of a corresponding character card 20, and the CPU 102 sets a direction change flag 506 in the character table 500 for the player character 200 so as to set the player character 200 in the player character direction change mode (step S224). Then, the CPU 102 proceeds to the process of step S233.

If, in a process of step S215, the position 502 registered in the character table 500 matches the position determined by the position registered in the first space of the history 504, it is a case in which the player character 200 is not to be moved on the field, and the CPU 102, depending on whether or not the direction 503 registered in the character table 500 for the player character 200 matches the direction determined by the direction registered in the first space of the history 504, determines whether or not the direction and/or the direction of the visual axis 304 is to be changed on the field (step S225).

If the direction 503 registered in the character table 500 matches the direction determined by the direction registered in the first space of the history 504, it is a case in which the direction of the player character 200 and/or the direction of the visual axis 304 is not to be changed on the field, and the CPU 102 deletes the position and direction registered in the first space of the history 504 (step S226). Then, the CPU 102 proceeds to the process of step S233.

If the direction 503 registered in the character table 500 does not match the direction determined by the direction registered in the first space of the history 504, the CPU 102 determines whether or not a selection flag 505 is set in the character table 500 for the player character 200 (step S227). If no selection flag 505 is set, as the player character 200 is not designated as the selected character, the CPU 102 proceeds to a process of step S230.

If a selection flag 505 is set, as the player character 200 is designated as the selected character, the CPU 102 moves the position of the visual point 303 by a predetermined amount to the position determined by the position and direction registered in the first space of the history 504 (that is, if the direction of the player character 200 is fixed in accordance with the direction of the character card 20, behind the player character 200 in the fixed direction). Then, the CPU 102 turns the direction of the visual axis 304 from the position of the visual point 303 toward the fiducial point 201 of the selected character (step S228).

The CPU 102, depending on whether or not a rotation angle from the direction of the visual axis 304 to the direction determined by the direction registered in the first space of the history 504 is a predetermined angle or greater, determines whether or not a change in the direction of the character card 20 has been carried out at or above the predetermined speed by the player (step S229). If the change in the direction of the character card 20 has been carried out at or above the predetermined speed, it is a case in which the direction of the player character 200 is not to be changed, and the CPU 102 proceeds directly to a process of step S231.

If the change in the direction of the character card 20 has not been carried out at or above the predetermined speed, as a direction of a player character 200 which is the selected character is also changed in accordance with the direction of the character card 20, the CPU 102 proceeds to the process of step S230. In step S230, the CPU 102 changes the direction 503 of the player character 200 by the predetermined amount to the direction determined by the direction registered in the first space of the history 504. Then, the CPU 102 proceeds to the process of step S231.

In step S231, the CPU 102, depending on whether or not the direction 503 registered in the character table 500 for the player character 200 matches the direction determined by the direction registered in the first space of the history 504, determines whether or not the player character 200 has turned in the direction corresponding to the direction registered in the first space of the history 504.

If the player character 200 has not turned in the direction corresponding to the direction registered in the first space of the history 504, the CPU 102 proceeds to the process of step S233. If the player character 200 has turned in the direction corresponding to the direction registered in the first space of the history 504, the CPU 102 deletes the position and direction registered in the first space of the history 504 (step S232). Then, the CPU 102 proceeds to the process of step S233.

In step S233, the CPU 102 adds 1 to the character number and assigns an obtained value as a new character number. Then, the CPU 102 determines whether or not the character number is 4 (step S234). If the character number is not 4, it is a case in which the processes of steps S210 to S231 have not been carried out for all the player characters 200 registered in the character table 500, and the CPU 102 returns to the process of step S210. If the character number is 4, it is a case in which the processes of steps S210 to S232 have been carried out, and the CPU 102 finishes the game process, and returns to the processes of the flowchart of FIG. 6.

As described heretofore, in the card game according to the embodiment, in the virtual three-dimensional space, in the event that a player character 200, which is disposed in a position corresponding to a position of a corresponding character card 20, and faces in a direction corresponding to a direction of the character card 200, is designated as the selected character, the fiducial point 201 of the selected character is set as the reference point, the direction of the visual axis 304 is set in the direction (the back to front direction) of the selected character, and the visual point 303 is set at the visual point distance on the visual axis 304 from the reference point. That is, by means of a player's intuitive operation of changing the position and direction of the character card 20, it is possible to control the position and direction of the player character 200, as well as the position of the visual point 303 of the virtual camera, and the direction of the visual axis 304.

Herein, in a case in which a direction of a character card 20 corresponding to the selected character is changed by the player without its position being moved on the card disposition panel 13, in the event that a speed at which the change in the direction is carried out is equal to or higher than the predetermined speed, the selected character does not change its direction 503. As opposed to this, the position of the visual point 303 moves in accordance with a player character 200, a direction of which is supposed to have been changed along a trajectory (a direction in the history 504) described by the direction of the character card 20 being changed and, in accordance with the movement of the position of the visual point 303, the direction of the visual axis 304 is changed in order to always use the fiducial point 201 of the player character 200 as the reference point. Herein, the position of the visual point 303, in accordance with the change in the direction of the character card 20, circularly moves with the fiducial point 201 of the player character 200 corresponding to the character card 20 as the reference point.

In this way, the player, by carrying out the operation of changing the direction of the character card 20 at or above the predetermined speed without changing the position of the character card 20, can change only the position of the visual point 303 and the direction of the visual axis 304 without changing the direction of the player character 200, and display an image of the player character 200, shot from a desired angle, on the LCD 11.

Meanwhile, in the event that the speed at which the change in the direction has been carried out is lower than the predetermined speed, the player character 200 also changes the direction 503 along the trajectory (the direction in the history 504) described by the direction of the character card 20 being changed, and the position of the visual point 303 and the direction of the visual axis 304 change following the change in the direction 503 of the selected character. By this means, the player, by varying a speed of one operation of changing the direction of the character card 20, can input two instructions, to change or not to change, the direction 503 of the player character 200 displayed on the LCD 11, resulting in an improvement in operability.

Also, in the event that the position of the character card 20 is moved on the card disposition panel 13 by the operation of the player, the position of the player character 200 is moved along the trajectory (the position in the history 504) formed by the position of the character card 20 being changed. Herein, in the event that the direction 503 of the selected character differs from the traveling direction (a direction toward the position registered in the first space of the history 504), firstly, the player character 200 changes the direction 503 to the traveling direction and, after that, moves through the position 502.

Although the position 502 and direction 503 of the player character 200, the position of the visual point 303, and the direction of the visual axis 304 are originally controlled in accordance with a position and direction of a corresponding character card 20, in a case in which the position of the character card 20 is moved by the operation of the player, the direction 503 of the player character 200 turns in the traveling direction of the player character 200 regardless of the direction of the character card 20. In this way, by turning a direction 503 of a player character 200, partway through moving, in the traveling direction regardless of the direction of the character card 20, it does not happen that a display of the player character 200 on the game screen becomes unnatural.

Also, the player can place a plurality of character cards 20 on the card disposition panel 13, and cause a plurality of player characters corresponding to them to participate in the game. Herein, a player character 200 corresponding to a character card 20 last placed on (that is, pressed or being pressed against) the card disposition panel 13 is designated as the selected character, and a fiducial point 201 of the player character 200 designated as the selected character becomes the reference point when carrying out the perspective transformation by means of the virtual camera.

It is conceivable that the last pressed card is a character card 20 corresponding to a player character 200 which the player most wants to operate at the present time. Also, it is conceivable that the player wants to cause a player character 200 corresponding to a pressed character card 20, which is not the last pressed character card 20, to act. Consequently, although the position of the visual point 303 and the direction of the visual axis 304 are controlled in accordance with the last pressed character card 20, as the position and direction of each player character 200, regardless of whether or not a corresponding character card has been last operated, are controlled in accordance with a position and direction of the character card 20, it is possible to display a game screen desired by the player as far as possible on the LCD 11.

Also, the player can carry out a change in the position 502 and direction 503 of a player character 200 by means of a corresponding character card 20 placed on the card disposition panel 13, and the player, without carrying out a complicated operation, can dispose a character card 20 corresponding to a player character 200 in a desired position, and turn it in a desired direction. Also, the more kinds of character card 20 the player owns, the more options of usable player characters 200 increase. By this means, there occurs not only pleasure in merely playing a game, but also enjoyment in collecting character cards 20 to be used in the game.

The invention not being limited to the heretofore described embodiment, various modifications and applications are possible. Hereafter, a description will be given of modified aspects of the heretofore described embodiment which are applicable to the invention.

In the heretofore described embodiment, an arrangement is such that, when a position of a character card 20 does not move, and only a direction thereof changes, only the position of the visual point 303 and the direction of the visual axis 304 are controlled in accordance with a speed of the change in the direction, or a direction of a player character 200 taken to be the selected character is controlled together with the position of the visual point 303 and the direction of the visual axis 304. In these cases, the position of the character card 20 not moving is not a rigid matter and, as long as a movement of a central position of the character card 20 for a time from a start to a finish of an operation of the character card 20 finishes in a predetermined distance or shorter (for example, a half of a shorter edge), it is possible to arrange in such a way that the position of the character card 20 does not move.

In the heretofore described embodiment, an arrangement is such that, in the case in which a position of a character card 20 is not changed, and only a direction thereof is changed, in the event that the direction is changed below the predetermined speed, as well as a direction of a player character 200 taken to be the selected character being changed in accordance with the change in the card direction, the position of the visual point 303 is circularly moved, while in the event that the speed of the change in the direction of the character card 20 is equal to or higher than the predetermined speed, the direction of the player character 200 not being changed, only the circular movement of the position of the visual point 303 is carried out.

Naturally, it is also acceptable to arrange in such a way that, in the event that the direction of the character card 20 is changed below the second predetermined speed which is lower than the predetermined speed, the direction of the player character 200 is changed, but the position of the visual point 303 and the direction of the visual axis 304 are not changed. When the direction of the character card 20 is changed at or above the second predetermined speed and below the predetermined speed, as well as the direction of the player character 200 being changed, the visual point 303 is circularly moved with the fiducial point 201 of the player character 200 as the reference point.

In this case, the player, by varying the speed of one operation of changing the direction of the character card 20 can, as well as changing the direction of the player character 200, input three instructions, to circularly move the position of the visual point 303, to change the direction of the player character 200 but not to circularly move the position of the visual point 303, or to circularly move the position of the visual point 303 without changing the direction of the player character 200, resulting in the improvement in operability. A division of the speed of the change in the direction of the character card 20 which separates the three instructions not being limited to the heretofore described ones, it is possible to divide it into optional ranges.

In the heretofore described embodiment, an arrangement is such that, in the case of moving the position of the character card 20 without changing the direction thereof, the player character 200 turns in the traveling direction and not a direction corresponding to that of the character card 20, but it is possible to arrange in such a way that the player character 200 is turned in the traveling direction even in the event that, when the position of the character card 20 is moved, the direction thereof has also been changed. In this case, it is also acceptable to arrange in such a way that the position of the visual point 303 and the direction of the visual axis 304 are either controlled in accordance with an initial direction of the player character 200, or controlled in accordance with a position and direction of a player character 200 supposed to have been controlled in accordance with the change in the position and direction of the character card 20.

In the heretofore described embodiment, an arrangement is such that, when the position of the player character 200 is being moved in accordance with the change in the position of the character card 20, the player character 200 turns in the traveling direction, while the position of the visual point 303 and the direction of the visual axis 304, supposing that the player character 200 faces in a direction corresponding to the direction of the character card 20, are decided with the position and direction of the supposed player character 200 as a reference. As opposed to this, it is also acceptable to arrange in such a way that the position of the visual point 303 and the direction of the visual axis 304 are fixed with a position and direction of a moving player character 200 itself as the reference.

In this case, in the event that the character card 20 is moved, the player character 200 moves facing in the traveling direction in accordance with a trajectory of the movement of the character card 20, and the position of the visual point 303 and the direction of the visual axis 304 are fixed in accordance with the direction of the moving player character 200 itself. For this reason, it being possible to display an image of a player character 200 taken to be the selected character, which is always seen from a predetermined direction, on the LCD 11, the player can always see a player character 200 from the same direction, except in a case of changing a direction of a character card 20 without changing a position thereof.

In this case, after the player character 200 moving facing in the traveling direction arrives at a position corresponding to a position in which the movement of the character card 20 has been completed, the direction of the player character 200 is changed to a direction corresponding to a direction when the movement of the character card 20 is complete. It is also acceptable to arrange in such a way that, in accordance with the change in the direction of the player character 200, the position of the visual point 303 is mediated by and moved around the player character 200.

By this means, as it is possible to finally cause not only the position and direction of the player character 200, but also the position of the visual point 303 and the direction of the visual axis 304, to correspond to the position and direction of the character card 20, it is possible to fix the position and direction of the player character 200, the position of the visual point 303, and the direction of the visual axis 304, while respecting as much as possible an operation which the player has carried out on the character card 20.

In the heretofore described embodiment, an arrangement is such that a direction change is preferentially carried out for a player character 200 set in the direction change mode. As opposed to this, it is also acceptable to arrange in such a way that, in the event that a history is registered for a time from a player character 200 being set in the direction change mode until the mode is cancelled (before it turns in a direction corresponding to that of a character card 20), the direction change mode is cancelled.

In the heretofore described embodiment, an arrangement is such that a player character 200 moves in the virtual three-dimensional space at the predetermined speed. As opposed to this, it is also acceptable that a player character 200 moves at a speed corresponding to a speed at which a character card 20 corresponding to the player character 200 is moved and/or directionally changed on the card disposition panel 13. In this case, it is preferable to set a threshold for the movement speed of the player character 200.

In the heretofore described embodiment, the visual point distance is constant with respect to all the player characters 200. As opposed to this, it is also acceptable that the visual point distance varies depending on each player character 200. It is also acceptable that the visual point distance is either fixed for each player character 200, or changed in accordance with predetermined conditions. For example, it is possible to make the visual point distance of a large player character 200 long, or make the visual point distance of a small player character 200 short. Also, it is also acceptable to arrange in such a way that, by another character being positioned close to the selected character, the visual point distance is changed in order to include the other character.

In the heretofore described embodiment an arrangement is such that, the card disposition panel 13 includes the touch panel 16 and, in the event that there is a character card 20 in a position in which the touch panel 16 is touched, a player character 200 corresponding to the character card 20 becomes a new selected character. As opposed to this, for example, it is also acceptable in such a way as to determine whether or not even a slight change occurs in an image of a character card 20 read by the image sensor 108, and determine that the character card 20, in the read image of which the change has occurred, is pressed by the player.

In the heretofore described embodiment, a description has been given, as an example, of a case to which the invention is applied in the card game apparatus 1 using a character card 20. Naturally, it is possible to apply the invention to an overall game in which the player selects a player character 200 acting in accordance with the operation of the player. A quantity of player characters 200 not being limited to three, it is possible to adopt an optional quantity of one or more.

A computer apparatus, which is a platform carrying out a game in which the invention is embodied, not being limited to the heretofore described kind of card game apparatus 1, it is possible to apply it to a stationary home-use game machine, a portable game machine, a personal computer, or furthermore, a portable telephone including an application execution function, and the like. In a case of applying one of them as the platform, it is also possible to arrange in order to carry out a competition between two persons via a network such as an internet, or with their apparatus connected to an infrared wireless communication or the like.

Herein, in a case in which the computer apparatus, which is the platform carrying out the game in which the invention is embodied, includes a second display device with a touch panel disposed on its top surface, apart from the display device corresponding to the LCD 11, it is also acceptable to arrange in order to display a plurality of virtual cards on the second display device, and allow each virtual card to be selected by means of a touch operation of the touch panel. Herein, a character corresponding to a virtual card displayed in a position in which the touch operation has been carried out becomes the selected character. Also, it is also acceptable to arrange in such a way that a position and/or direction of each virtual card is changed by the touch operation of the touch panel. In this case, even without preparing a tangible card, it is possible to realize the same game element as that of the game according to the heretofore described embodiment.

In the heretofore described embodiment, the program and data for executing the game to which the invention is applied are stored in advance in the memory 103 of the card game apparatus 1. Naturally, in a case in which the stationary or portable game machine, the personal computer or the like is applied as the platform which realizes the invention, it is also possible to apply a semiconductor memory card, an optical and/or magnetic disk (a flexible disk, a CD-ROM, a DVD-ROM or the like) to the program and data in accordance with an aspect of the computer apparatus which is the platform. In a case of using a computer apparatus including a fixed disk drive as the platform, it is also acceptable that the program and data are stored in advance in the fixed disk drive.

Furthermore, in a case of applying a computer apparatus which can communicate with another computer apparatus via the network (including the card game apparatus 1 according to the heretofore described embodiment), it is also acceptable that the program and data are stored in a fixed disk drive included in a server existing on the network, and distributed via the network. In a case of the card game apparatus 1 according to the heretofore described embodiment, it is sufficient to apply a flash memory as the memory 103.

What is claimed is:
1. A game apparatus which displays, on a display, a game screen obtained by perspectively transforming, onto a virtual screen, a virtual three-dimensional space, in which a character acts in accordance with an instruction from a player, from a viewpoint of a virtual camera, the apparatus comprising:
a card disposition system that disposes a card on a plane corresponding to a virtual two-dimensional plane perpendicular to a height direction of the virtual three-dimensional space, a position and a rotary direction of the card being changeable by the player;

a card detector that detects the position of the card and the rotary direction of the card disposed on the card disposition system;

a character controller that controls a position and a rotary direction of the character in accordance with the position of the card and the rotary direction of the card detected by the card detector, the rotary direction of the character indicating a direction in which the character faces;

a virtual camera controller that controls a position of a visual point and a direction of a visual axis of the virtual camera with the position of the character as a reference point, in accordance with the position of the card and the rotary direction of the card detected by the card detector, the direction of the visual axis being defined as a direction from the position of the visual point towards the position of the character;

a perspective transformer that perspectively transforms onto the virtual screen the virtual three-dimensional space from the viewpoint of the virtual camera, in which the position of the visual point and the direction of the visual axis are fixed by the virtual camera controller, and generates a two-dimensional image to be displayed on the display; and a display controller that display the two-dimensional image generated by the perspective transformer on the display, wherein the character controller does not change the rotary direction of the character when the rotary direction of the card detected by the card detector is changed by rotation of the card and the position of the card detected by the card detector is not substantially changed, and wherein when the rotary direction of the card detected by the card detector is changed by rotation of the card and the position of the card detected by the card detector is not substantially changed, the virtual camera controller circularly moves the position of the visual point around the character in order to change the direction of the visual axis in accordance with the change in the rotary direction of the card.

2. The game apparatus according to claim 1,
wherein the character controller does not change the rotary direction of the character, when the position of the card detected by the card detector is not substantially changed and the rotary direction of the card is changed at a speed within a predetermined range, and
wherein the character controller changes the rotary direction of the character in accordance with the change in the rotary direction of the card, when the position of the card detected by the card detector is not substantially changed and the rotary direction of the card is changed at a speed outside the predetermined range.

3. The game apparatus according to claim 2,
wherein the virtual camera controller does not circularly move the position of the visual point when the position of the card detected by the card detector is not substantially changed and the rotary direction of the card is changed at a speed outside the predetermined range and within a second predetermined range, and
wherein the virtual camera controller circularly moves the position of the visual point in accordance with the change in the rotary direction of the card when the position of the card detected by the card detector is not substantially changed and the rotary direction of the card is changed at a speed outside the predetermined range and outside the second predetermined range.

4. The game apparatus according to claim 1,
wherein when the position of the card detected by the card detector is moving, the character controller moves the position of the character in a direction in which the position of the card moves, regardless of the detected rotary direction of the card, and controls the rotary direction of the character when the position of the character is moving, to a direction in which the character moves.

5. The game apparatus according to claim 4,
wherein after the movement of the position of the character corresponding to the movement of the position of the card is complete, the character controller changes the rotary direction of the character to the rotary direction of the card at a time at which the movement of the card is complete.

6. The game apparatus according to claim 4,
wherein when the position of the card detected by the card detector is moving, the virtual camera controller moves the position of the visual point in the direction in which the position of the card moves, while maintaining the rotary direction of the visual axis in a predetermined direction, regardless of the detected direction of the card.

7. The game apparatus according to claim 4,
wherein when the position of the card detected by the card detector is moving, the virtual camera controller moves the position of the visual point so that the direction of the visual axis becomes a direction corresponding to the rotary direction of the character, regardless of the detected rotary direction of the card.

8. The game apparatus according to claim 6,
wherein after the movement of the position of the character corresponding to the movement of the position of the card is complete, the virtual camera controller moves the position of the visual point so that the direction of the visual axis becomes the rotary direction of the card at the time point at which the movement of the position of the card is complete.

9. The game apparatus according to claim 1,
wherein the card disposition system disposes each of a plurality of cards in an arbitrary position and in an arbitrary rotary direction,
the card detector comprises an operated card determiner that determines a card, from the plurality of cards, which has last been operated by the player,
the character controller controls the position and the rotary direction of a character corresponding to each card in accordance with positions and rotary directions of the plurality of cards, regardless of whether the card is determined by the operated card determiner to have last been operated, and
the virtual camera controller controls the position of the visual point and the direction of the visual axis of the virtual camera in accordance with a position of a character corresponding to the last operated card as the reference point.

10. The game apparatus according to claim 1,
wherein the card disposition system comprises a card mounting base on which a tangible card is placed, the tangible card recording information which identifies the character corresponding to the tangible card,
the apparatus further comprising:
a card information reader that reads the information which is recorded on the card placed on the card mounting base, wherein
the card detector detects the position and the rotary direction of the card in accordance with the information read by the card information reader.

11. The game apparatus according to claim 1,
wherein the card disposition system comprises a virtual card display system that displays a virtual card configured to correspond to the character as the card on a second display which is provided separately from the display and has a touch panel disposed on a front surface of the second display,
the apparatus further comprising:
a virtual card controller that changes a position and a rotary direction of the virtual card displayed on the second display in accordance with an operation of the touch panel by the player,
wherein the card detector detects the position and the rotary direction of the virtual card displayed on the second display.

12. A character and virtual camera control method in a game in which a game screen is obtained by perspectively transforming, onto a virtual screen, a virtual three-dimensional space, in which a character acts in accordance with an instruction from a player, from a viewpoint of a virtual camera, and the transformed virtual space is displayed on a display, the method comprising:
  detecting a position and a rotary direction of a card disposed, by the player, on a plane corresponding to a virtual two-dimensional plane perpendicular to a height direction of the virtual three-dimensional space, and storing the detected position and the rotary direction of the card in a storage device;
  when the rotary direction of the card is changing without the position of the card substantially changing, controlling a position and a rotary direction of the character, in accordance with the position of the card and the rotary direction of the card stored in the storage device, in order not to change the rotary direction of the character, the rotary direction of the character indicating a direction in which the character faces;
  when the rotary direction of the card is changed without the position of the card substantially changing, controlling a position of a visual point and a direction of a visual axis of the virtual camera with the position of the character as a reference point, in accordance with the position of the card and the rotary direction of the card stored in the storage device, in order to change the direction of the visual axis by circularly moving the position of the visual point around the character in accordance with the change in the rotary direction of the card, the direction of the visual axis being defined as a direction from the position of the visual point towards the position of the character;
  perspectively transforming the virtual three-dimensional space from the virtual camera onto the virtual screen, the position of the visual point and the direction of the visual axis of the virtual camera being fixed, and generating a two-dimensional image to be displayed on the display; and
  displaying the generated two-dimensional image on the display.

13. A non-transitory computer readable medium on which a game program executed by a computer apparatus is recorded, which, when executing a game by operating a character in accordance with the game program, perspectively transforms onto a virtual screen, from the viewpoint a virtual camera, a virtual three-dimensional space in which a character acts in accordance with an instruction from a player, and displays the transformed virtual three-dimensional space on a display, the game program comprising:
  a card disposition system that disposes a card on a plane corresponding to a virtual two-dimensional plane perpendicular to a height direction of the virtual three-dimensional space, a position and a rotary direction of the card being changeable by the player;
  a card detector that detects the position of the card and the rotary direction of the card disposed on the card disposition system;
  a character controller that controls a position and a rotary direction of the character in accordance with the position of the card and the rotary direction of the card detected by the card detector, the rotary direction of the character indicating a direction in which the character faces;
  a virtual camera controller that controls a position of a visual point and a direction of a visual axis of the virtual camera with the position of the character as a reference point in accordance with the position of the card and the rotary direction of the card detected by the card detector, the direction of the visual axis being defined as a direction from the position of the visual point towards the position of the character;
  a perspective transformer that perspectively transforms onto the virtual screen the virtual three-dimensional space from the viewpoint of the virtual camera, in which the position of the visual point and the direction of the visual axis are fixed by the virtual camera controller and generates a two-dimensional image to be displayed on the display; and
  a display controller that displays the two-dimensional image generated by the perspective transformer on the display,
  wherein the character controller does not change the rotary direction of the character when the rotary direction of the card detected by the card detector is changed by rotation of the card and the position of the card detected by the card detector is not substantially changed, and
  wherein the virtual camera controller circularly moves the position of the visual point around the character in order to change the direction of the visual axis in accordance with the change in the rotary direction of the card by a rotation of the card, when the rotary direction of the card detected by the card detector is changed and the position of the card detected by the card detector is not substantially changed.

* * * * *